United States Patent [19]

Taylor

[11] Patent Number: 4,480,898

[45] Date of Patent: Nov. 6, 1984

[54] FIBERS WITH MULTIPLE COATINGS

[75] Inventor: Carl R. Taylor, Lawrenceville, Ga.

[73] Assignee: AT&T Bell Laboratories, Murray Hill, N.J.

[21] Appl. No.: 581,787

[22] Filed: Feb. 21, 1984

Related U.S. Application Data

[62] Division of Ser. No. 454,159, Dec. 29, 1982.

[51] Int. Cl.[3] .............................................. G02B 5/14
[52] U.S. Cl. ............................... 350/96.30; 264/174; 427/54.1; 427/163; 427/299; 427/407.1; 427/407.2; 428/375; 428/395
[58] Field of Search ................. 428/375, 395; 427/163, 427/299, 407.1, 407.2, 54.1; 264/174; 350/96.30

[56] References Cited

U.S. PATENT DOCUMENTS

| 3,947,173 | 3/1976 | Dougherty | 425/113 |
| 4,264,649 | 4/1981 | Claypoole et al. | 427/163 |
| 4,374,161 | 2/1983 | Geyling et al. | 427/160 |
| 4,409,263 | 10/1983 | Aloisio et al. | 427/163 |

OTHER PUBLICATIONS

Sato et al., "Double Layer Silicone Coating with Double Cone Nozzle In-Line with Optical Fiber Drawing" Optical Communication Conference, pp. 5.6-1 thru 5.6-4, 9/19/79.

Chida et al., "High-Speed Coating of Optical Fibers with Thermally Curable Silicone Resin Using a Pressurized Die", Electronics Letters, vol. 18, 1982, pp. 713-715.

*Primary Examiner*—Sadie L. Childs
*Attorney, Agent, or Firm*—Eugen E. Pacher; James H. Fox

[57] ABSTRACT

Fibers are coated with two (or more) layers. A first coating liquid is applied by an applicator having a die that provides for the formation of a gap between the die and the first coated layer. A second die is located at the exit of the first die, with the second coating liquid flowing onto the fiber through a relatively narrow clearance between the first and second dies. The clearance is formed by die surfaces perpendicular to the fiber axis. This second die also provides for a gap, so that the second layer is applied at a "free surface" at the point of contact with the first coated layer. This approach eliminates turbulence and coating nonuniformities associated with prior art multiple coating techniques.

5 Claims, 2 Drawing Figures

FIBERS WITH MULTIPLE COATINGS

This is a division of application Ser. No. 454,159, filed Dec. 29, 1982.

BACKGROUND OF THE INVENTION

1. Field of the Invention

This invention relates to a fiber having two or more coating layers.

2. Description of the Prior Art

Dual coated optical fibers are becoming increasingly used to obtain design flexibility and improved performance. Typically, a first or primary coating layer is applied that comprises a low-modulus material. Such a material reduces microbending losses associated with the cabling, installation, or environmental changes during the service life of the optical fiber. An outer or secondary coating layer is applied onto the primary layer. The outer coating layer is usually of a higher modulus material to provide for abrasion resistance for the fiber and primary coating layer. The first coating layer can be applied in an open cup applicator which may have a rigid or flexible tip. It is also known to use pressurized applicators for increasing the coating speed and to reduce the entrapment of bubbles, etc.; see, for example, U.S. patent application Ser. No. 257,354, filed Apr. 24, 1981, now U.S. Pat. No. 4,374,161 coassigned with the present invention. In the prior art, the secondary coating layer has typically been applied by techniques that substantially duplicate the application of the first coating layer; that is, upon the exit of the fiber from a first coating reservoir, the fiber enters a second coating reservoir containing the secondary coating material; see, for example, "Double Layer Silicone Coating With Double Cone Nozzle In-Line With Optical Fiber Drawing," by M. Sato et al, in the *Proceedings Of The Fifth European Conference On Optical Communication*, page 5.6-1 (Amsterdam, 1979).

It is desirable to have improved methods of forming multiple coatings on a fiber.

SUMMARY OF THE INVENTION

I have invented a method of multiply coating a fiber. A fiber is passed through a coating applicator comprising first and second dies. The first die confines a first coating liquid over a portion of the fiber's length. A second coating liquid is applied onto the fiber through a clearance between the first and second dies. The clearance is sufficiently small so that substantially no recirculation of the second coating liquid occurs in the vicinity of the point of application to the fiber. The second coating liquid is preferably applied at a free surface; that is, not in contact with either the first or second dies in the immediate vicinity of the point of application to the fiber. Additional coatings can be applied in a similar manner.

DETAILED DESCRIPTION

The following detailed description relates to a method of applying multiple coating layers onto a fiber. In the present technique, a fiber is passed through a first coating die and thereafter into a second coating die located near the exit of the first die. The second coating liquid flows onto the fiber through a clearance between the first and second dies. The clearance is sufficiently small in the vicinity of the point of application so that substantially all the second coating liquid flows directly onto the fiber without recirculation. The clearance is formed by adjacent surfaces of the first and second dies that are preferably perpendicular to the fiber axis. The coating applicator is preferably designed so that a gap forms on either side of the second coating liquid in the vicinity of the point of contact of the second coating liquid with the previously coated portion of the fiber. In this manner, instabilities and nonuniformities associated with prior art techniques are substantially eliminated.

Figure 1:
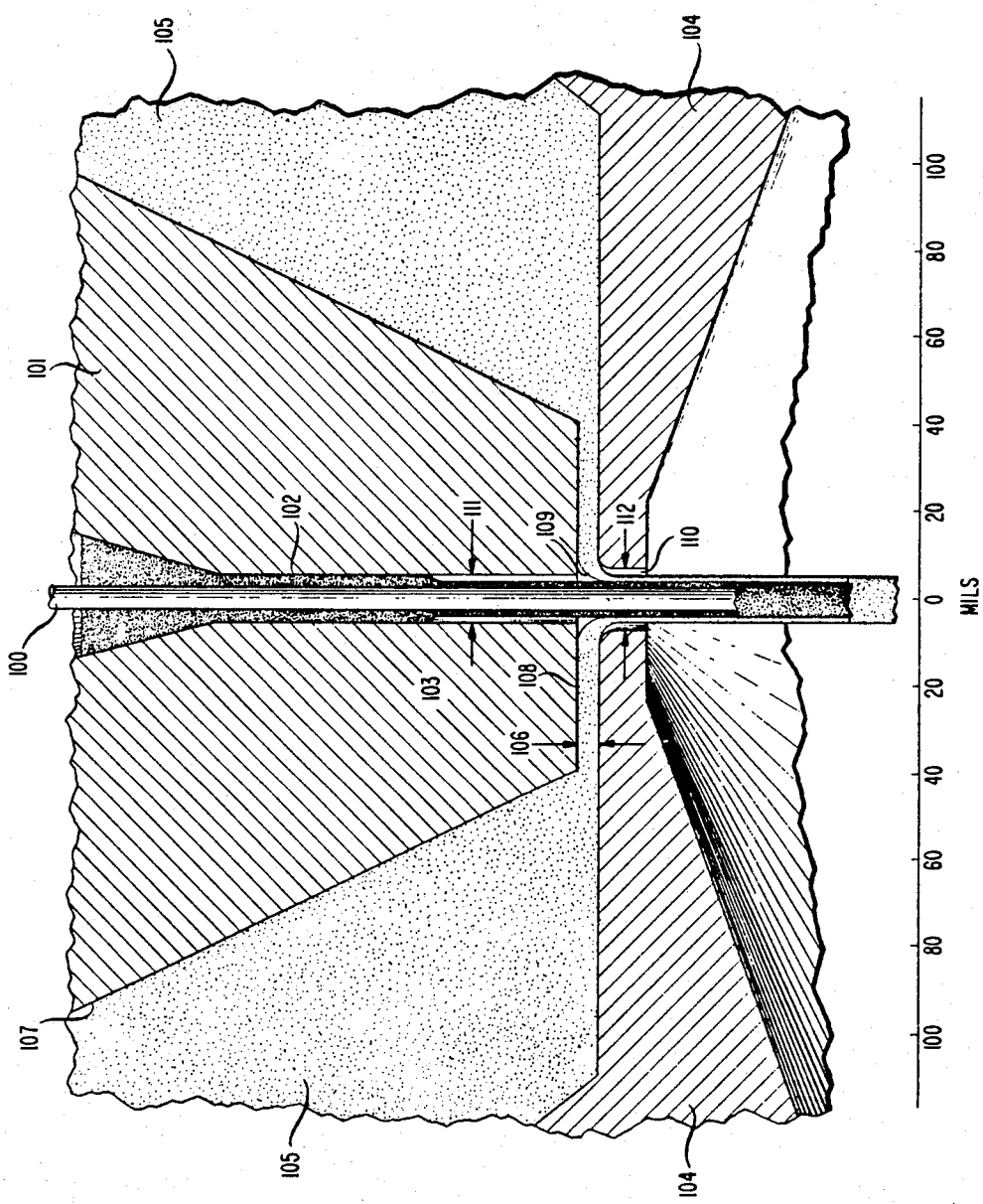
FIG. 1 illustrates a coating die suitable for applying a second coating according to the present invention.

Referring to FIG. 1, a fiber 100 is passed through a coating applicator having a die 101 into which is introduced a primary coating liquid in land section 102. At the exit of die 101 is located a second die 104, with a clearance 106 provided between the dies. As used herein, the term "die" means that portion of the applicator which last confines or aids in confining a given coating layer around the fiber. It does not necessarily directly determine the size of that coating layer. The secondary coating liquid flows from reservoir 105 through clearance 106 onto the fiber. The width of the clearance 106 in the immediate vicinity of the point of application of the second coating liquid onto the fiber is typically less than 3 times the diameter of fiber 100, including the thickness of the first coating, and preferably less than 2 times the diameter. The small width is desirable to prevent the formation of an eddy of the second coating liquid in the vicinity of the point of application. Such recirculation can cause undesirable instabilities and mixing with the previously applied first coating. In addition, it has been found desirable to form the clearance by surfaces perpendicular to the fiber axis. This allows the end surface 108 (bottom surface of die 101 as viewed in FIG. 1) to be a broad surface, which is desirable for accurate adjustment of the clearance 106 to obtain a uniform flow onto the fiber. This design also significantly eases mechanical tolerances in machining the dies to obtain a hole of the desired shape in the desired location, as compared to designs wherein the end of die 101 is a sharp edge formed by the intersection of land section 102 and diagonal surface 107. Furthermore, the blunt end of the present design makes the dies much less fragile, and thus less subject to damage than sharp edge designs. As a result, the second coating liquid in the clearance region 106 flows perpendicularly to the axis of fiber 100 until entering the transition region 109 in the immediate vicinity of the point of contact with the fiber.

In a preferred embodiment, the land section 102 has a length and diameter so that at the desired fiber draw speed and first coating liquid pressure, a gap 103 forms between the first coating liquid and the inside surface of land 102. The formation of gap 103 helps provide for a smooth transition in the flow of the second coating liquid onto the first coating in region 109. It also helps decouple gap 110, discussed below, from any irregularities in the flow of the first coating liquid. However, it is possible to practice the present technique without gap 103. The fiber draw rate, the pressure of the second coating liquid in reservoir 105, and the diameter of the aperture of die 104 around the fiber are chosen so that a gap 110 forms between the second coating and die 104.

In this manner, the second coating liquid is preferably applied onto the first coating at a "free surface"; that is, unconstrained by a solid surface in the immediate vicinity of the point at which the second coating is applied to the first coating. Gap 110 desirably extends into the aperture of die 104 at least as far as the initial point of contact of the second coating liquid and the first coating. The existence, location, and dimensions of gaps 103 and 110 can be determined, for example, by constructing a clear plastic model of the coating apparatus and operating it with the coating liquids to be used.

The second coating liquid in the present technique accelerates to the fiber velocity by elongational flow in the vicinity of the free surface, and there are thus no abrupt changes in the second coating liquid velocity as it is applied to the first coating. This technique avoids shear between the first and second coating liquids, thereby substantially reducing the possibility of mixing between the first and second coating liquids. Once the coating process has reached a stable, steady state condition, the first gap 103 is substantially isolated from the atmosphere and is at least partially evacuated. This is because the first coating liquid in the upper portion of the die 101 forms a hermetic seal on one side, whereas the second coating liquid likewise forms a hermetic seal on the other side of the applied first coating in the vicinity of gap 103. This is very advantageous in reducing the possibility of bubble entrapment in the second coating, since there is no contact with the atmosphere that would allow for bubble entrapment between the first and second coatings.

The position of the coating applicator that applies the first coating can be any of a number of conventional designs as long as it provides in operation the gap 103 as described above. To produce gap 103, it has been found desirable to provide a straight land section 102, which is the section of the die 101 near the exit; that is, the die has a constant diameter in the exit portion of its length. To achieve a high-quality first coating, it is desirable to obtain a bubble-free coating. One method of obtaining a bubble-free first coating is to provide for an interior baffle in a coating reservoir that continually removes bubbles that are entrained in a fiber as it enters a coating applicator; see U.S. Pat. No. 4,349,587, coassigned with the present invention. The removal of bubbles is also facilitated by the use of a pressurized "dual cup" coating applicator, wherein a fiber passes from a first chamber through a narrow orifice into a second pressurized chamber. Such a design is described in U.S. patent application Ser. No. 343,134, filed Jan. 27, 1982, and coassigned with the present invention.

Figure 2:
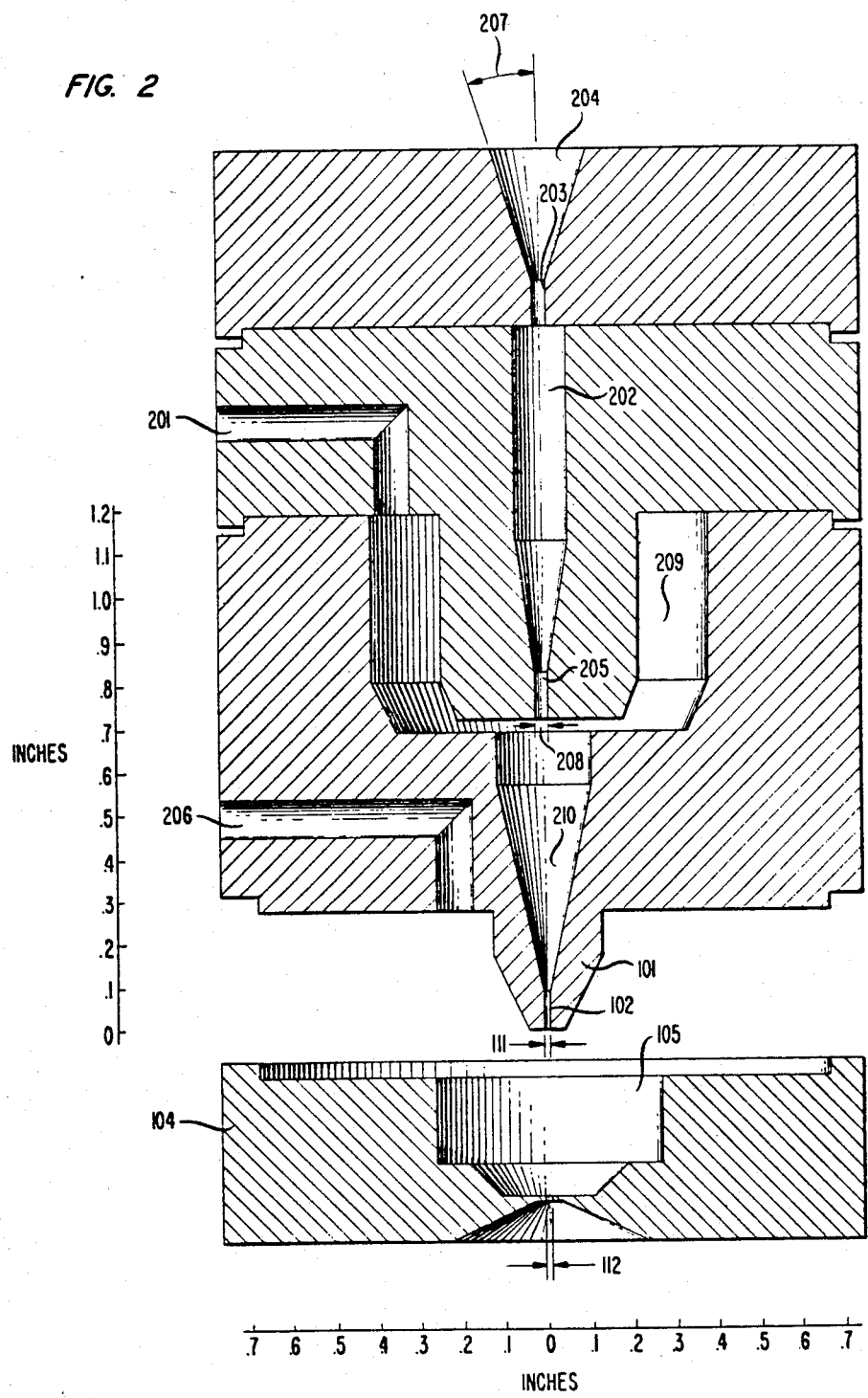
FIG. 2 illustrates an apparatus for applying both a first and second coating according to the present invention.

A coating applicator embodying the present technique and also providing for a high-quality primary coating is shown in FIG. 2. The secondary die 104 is shown in exploded view from the primary die 101 for clarity. In this applicator, a fiber (not shown) passes through entrance portion 204 through passage 203 and into chamber 202. The primary coating liquid is fed under pressure through entrance 201 into reservoir 209 and chamber 210. This liquid is also forced by the pressure up through passage 205 into chamber 202 and up to the top of passage 203. The passage 203 opens into entrance cone 204 having a taper angle 207 of from 5 to 45 degrees and typically about 15 degrees. In operation, the pressure of the primary coating is adjusted so that the meniscus of the coating liquid is located in the vicinity of the top of passage 203, without extending significantly into cone 204. This has been found to reduce the entrainment of bubbles that otherwise become entrapped in the fiber coating as it passes into a large open coating reservoir. Furthermore, in accordance with the above-noted patent and patent application, the narrow passage 205 serves as a "bubble stripper" that substantially eliminates any remaining bubbles that are entrained in the coated fiber. This is facilitated by the pressure drop between chamber 210 and chamber 202 that occurs along passage 205. In many cases, the action of entry sections 203 and 204 mentioned above make the inclusion of a bubble stripper section unnecessary.

The secondary coating liquid is applied through pressure feed 206 into coating chamber 105, shown in exploded view in FIG. 2. The aperture of die 104 is chosen so that for a given fiber draw rate and secondary coating liquid pressure, a gap forms between the coated fiber and the die 104.

In the above-noted design, with the pressure for the primary coating adjusted as noted above for a given fiber line speed, the primary coating diameter is determined mainly by the diameter of land 102 in die 101. The secondary coating thickness can readily be adjusted by changing the secondary feed pressure. A desirable feature of the present technique is that the primary and secondary coating thicknesses can thus be independently adjusted. Since the secondary coating is introduced by a pressure feed through a rigid orifice, a uniform concentric thickness of secondary coating can be maintained. A further advantage relates to centering of the fiber in the coating. Once the composite structure is centered, the primary and secondary coatings are both concentric about the fiber. A convenient way of centering the fiber in the coating applicator is described in "The Centering Of Optical Fiber Coatings By Monitoring Forward-Scattering Patterns, Theory And Practice," by B. R. Eichenbaum in the *Bell System Technical Journal*, Vol. 59, page 313 (1980).

The above-noted principles will be more fully illustrated by means of the following example.

EXAMPLE

In this Example, a silica optical fiber having an outer diameter of 125 micrometers (0.0049 inch) is coated in the apparatus shown in FIG. 2, with dimensions as described therein. The applicator was made of stainless steel, with other materials being possible. The fiber was passed through the coating applicator at a speed of 1.8 meters per second. A low-modulus, ultraviolet-curable primary coating material was applied at a pressure of 113 pounds per square inch, as measured in primary pressure feed 201. The diameter 208 of the bubble stripper passage 205 was 0.635 mm (0.025 inch). The diameter 111 of land section 102 was 0.254 mm (0.01 inch). A secondary coating material of an ultraviolet-curable epoxy acrylate was coated onto the primary coating at a secondary pressure feed of 70 pounds per square inch at inlet 206. The clearance 106 between the secondary die 104 and the primary die 101 was 0.127 mm (0.005 inch). The diameter 112 of the aperture in secondary die 104 was 0.381 mm (0.015 inch). Upon exiting the dual coating applicator, the optical fiber coatings were cured by exposure to ultraviolet radiation. The resulting coated fiber had a primary coating diameter of 0.196 mm (0.0077 inch) and a total outside diameter of 0.246 mm (0.0097 inch).

It is apparent that one or more additional coating layers can be applied by providing additional dies according to the present technique. While a silica glass optical fiber was discussed illustratively above, coating of a plastic optical fiber is also possible. The technique can also be used for coating other types of fibers. For example, carbon fibers, boron fibers, and nonoptical glass fibers are used as strength elements in many applications. Furthermore, multifilament fibers of glass (e.g., fiberglass) or Kevlar (trademark of E. I. Dupont for an aromatic polyamide), among others, can advantageously be coated by the present technique. While the shape of the opening in the dies is typically round, other shapes are possible. All such uses of the present teaching are within the scope of the invention.

What is claimed is:

1. A fiber coated by a process comprising passing the fiber through a first coating die that confines a first coating liquid around the fiber, the process further comprising thereafter passing the fiber through a second die, with a second coating liquid being applied onto the first coating liquid through a clearance between the first and second dies that is sufficiently small so that substantially no recirculation of the second coating liquid occurs in the immediate vicinity of the point of application to the first coating liquid, and wherein a gap forms between the second coating liquid and the aperture of the second die.

2. Fiber according to claim 1, wherein the fiber is an optical fiber.

3. Fiber according to claim 1, wherein the first and the second coating liquids are ultraviolet-radiation-curable materials, and wherein the first and the second coating liquids are cured by exposure to ultraviolet radiation.

4. Fiber according to claim 1, wherein the fiber comprises a multiplicity of filaments.

5. Fiber according to claim 1, wherein the process further comprises passing the fiber, prior to passing it through the first coating die, through a bubble stripper.

* * * * *